United States Patent [19]

Behme et al.

[11] Patent Number: 5,169,873
[45] Date of Patent: Dec. 8, 1992

[54] PROCESS FOR THE MANUFACTURE OF FOAMS WITH THE AID OF BLOWING AGENTS CONTAINING FLUOROALKANES AND FLUORINATED ETHERS, AND FOAMS OBTAINED BY THIS PROCESS

[75] Inventors: Klaus-Jürgen Behme, Eppstein/Taunus; Hans-Matthias Deger, Hofheim am Taunus; Claudia Schütz, Flörsheim am Main, all of Fed. Rep. of Germany

[73] Assignee: Hoechst Aktiengesellschaft, Frankfurt am Main, Fed. Rep. of Germany

[21] Appl. No.: 664,624

[22] Filed: Mar. 4, 1991

[30] Foreign Application Priority Data

Mar. 6, 1990 [DE] Fed. Rep. of Germany ....... 4006952

[51] Int. Cl.$^5$ .............. C08J 9/14; C08G 18/08
[52] U.S. Cl. .................... 521/114; 521/131; 521/155
[58] Field of Search ............ 521/114, 131, 155

[56] References Cited

U.S. PATENT DOCUMENTS

| 4,931,482 | 6/1990 | Lamberts et al. ............ 521/131 |
| 4,972,002 | 11/1990 | Volkert ...................... 521/120 |
| 4,997,706 | 3/1991 | Smits et al. ................ 521/131 |
| 5,023,009 | 6/1991 | Merchant .................... 521/131 |
| 5,023,010 | 6/1991 | Merchant .................... 521/131 |
| 5,026,497 | 6/1991 | Merchant .................... 521/131 |
| 5,026,499 | 6/1991 | Merchant .................... 521/131 |
| 5,035,830 | 7/1991 | Merchant .................... 521/131 |
| 5,037,572 | 8/1991 | Merchant .................... 521/131 |
| 5,037,573 | 8/1991 | Merchant .................... 521/131 |
| 5,039,445 | 8/1991 | Merchant .................... 521/131 |
| 5,064,559 | 11/1991 | Merchant et al. ............ 521/131 |
| 5,064,560 | 11/1991 | Merchant .................... 521/131 |
| 5,093,377 | 3/1992 | Bartlett et al. ............. 521/131 |
| 5,096,933 | 3/1992 | Volkert ...................... 521/114 |
| 5,098,595 | 3/1992 | Merchant .................... 521/131 |
| 5,100,572 | 3/1992 | Merchant .................... 521/131 |

FOREIGN PATENT DOCUMENTS

| 0344537 | 12/1989 | European Pat. Off. . |
| 0416777 | 3/1991 | European Pat. Off. . |
| 1-135820 | 5/1989 | Japan . |
| 3-000744 | 1/1991 | Japan . |
| 1193122 | 5/1970 | United Kingdom . |
| 1209243 | 10/1970 | United Kingdom . |

OTHER PUBLICATIONS

Kirk-Othmer "Foamed Plastics" *In: Encyl. of Chem. Technology*, 3rd Ed., vol. II, 1980, pp. 87-89.
Kirk-Othmer "Urethane Polymers" *In: Encycl. of Chem. Technology*, 3rd Ed., vol. 23, 1983, pp. 576-607.
"Fluorine Compounds, Organic", *In: Ullman's Encyclopedia of Industrial Chem.*, vol. A11, 1988, pp. 349-389.

*Primary Examiner*—John Kight, III
*Assistant Examiner*—Rabon Sergent
*Attorney, Agent, or Firm*—Connolly and Hutz

[57] ABSTRACT

Process for the manufacture of foams with the aid of blowing agents containing fluoroalkanes and fluorinated ethers, and foams obtained by this process. The invention relates to a process for the manufacture of foams based on polyisocyanates by the reaction of polyisocyanates, compounds containing at least two hydrogen atoms reactive towards isocyanate groups, blowing agents and, if appropriate, other additives. The blowing agents used consist to the extent of at least 10 mol % of at least one fluoroalkane of formula (I), $C_aH_bF_c$, where $a=2-6$, $b=1-12$, and $c=2-13$, and at least one fluorinated ether of formula (II), $C_aH_bF_c\text{-}O\text{-}C_dH_eF_f$, where $a=1-6$, $b=1-12$, $c=1-12$, $d=1-2$, $e=0-5$ and $f=0-5$. The invention further relates to the foams obtained by this process.

14 Claims, No Drawings

PROCESS FOR THE MANUFACTURE OF FOAMS WITH THE AID OF BLOWING AGENTS CONTAINING FLUOROALKANES AND FLUORINATED ETHERS, AND FOAMS OBTAINED BY THIS PROCESS

DESCRIPTION

The invention relates to a process for the manufacture of foams based on polyisocyanates, especially of polyurethane and polyisocyanurate foams. The manufacture of such foams is known and is described for example in Kunststoff-Handbuch (Plastics Handbook), volume VII, Polyurethane (Polyurethanes), Carl Hanser Verlag Munich, Vienna (1983), pages 246 to 331, and in EP-A1-0 077 964, EP-A1-0 334 059 and DE-AS 1 694 138 (=British patent 1 209 243).

The raw materials which can be used and the possible processes for the manufacture of rigid polyurethane foams are summarized in Ullmanns Enzyklopädie der technischen Chemie (Ullmann's Encyclopedia of Industrial Chemistry) (1980), volume 19, pages 301 to 341.

Also, appropriate references are to be found in Kirk-Othmer, Encycl. of Chem. Technology, 3rd edition, vol. 11 (1980), pages 87-89 and vol. 23 (1983), pages 576-607.

Conventional blowing agents for polyurethanes are carbon dioxide—which is produced by the addition of water in the manufacture of polyurethanes from polyisocyanates and compounds containing reactive hydrogen—and/or so-called "physical blowing agents", namely readily volatile organic substances such as acetone, ethyl acetate or halogen-substituted alkanes like methylene chloride, chloroform, ethylidene chloride, vinylidene chloride, monofluorotrichloromethane, chlorodifluoromethane, chlorohexafluoropropane or dichlorodifluoromethane, as well as butane, hexane, heptane or diethyl ether. The usability of fluorinated hydrocarbons for the manufacture of heat-insulating polyurethane foams is known e.g. from German patent 1 111 381. It is also possible to use inorganic blowing agents, e.g. air, $CO_2$ or $N_2O$. Further details on the use of blowing agents are described in Kunststoff- Handbuch (Plastics Handbook), volume VII, Carl-Hanser-Verlag, Munich (1966), e.g. on pages 108 and 109, 453 to 455 and 507 to 510.

Rigid polyurethane foams are predominantly manufactured using physical blowing agents In the manufacture of closed-cell foamed plastics, it is desirable for the blowing agents used to remain as cell gas in the foam, act as insulating gas therein and provide the foams with improved heat insulation.

In the course of the development of polyurethane foam technology, this requirement led to the use of chlorinated fluorinated hydrocarbons (CFC's), especially trichlorofluoromethane (CFC 11), as insulating and blowing gases.

Since then, however, CFC's have been suspected of damaging the earth's ozone layer. It is therefore necessary to refrain from using these compounds as soon as possible and to replace them as insulating and blowing gases with other substances which have no ozone-damaging potential.

The abandonment of CFC's in favor of $CO_2$, which as mentioned above—is formed by the addition of water in the manufacture of polyurethanes from polyisocyanates, is being discussed. Although this method is justifiable for some foams, it has great disadvantages, especially in the case of rigid foams, because the foams manufactured in this way have a higher thermal conductivity and hence a lower heat insulating capacity than foams manufactured with the aid of CFC's.

German patent application n° P 3 940 447.1 describes a process for the manufacture of foams with the aid of fluorinated ethers. German patent application n° P 3 940 977.5 relates to a process for the manufacture of foams with the aid of fluoroalkanes.

It has now been found that mixtures containing fluorinated ethers and various fluoroalkanes—especially fluoroalkanes which are gaseous at room temperature and are conventionally available as liquefied gases—are very suitable blowing and insulating gases for the manufacture of foams. In particular, it has been found that a mixture of fluoroalkanes, fluorinated ethers and $CO_2$ can be used as blowing agent, even small proportions of fluoroalkanes and fluorinated ethers (and a correspondingly high proportion of $CO_2$ and hence a high proportion of water in the rigid foam formulation) appreciably improving the heat insulating effect.

The invention relates to a process for the manufacture of foams based on polyisocyanates by the reaction of polyisocyanates, compounds containing at least two hydrogen atoms reactive towards isocyanate groups, blowing agents and, if appropriate, further additives, wherein the blowing agents used consist to the extent of at least 10 mol % of at least one fluoroalkane of formula (I), $C_aH_bF_c$, where $a=2-6$, $b=1-12$ and $c=2-13$, and at least one fluorinated ether of formula (II), $C_aH_bF_c-O-C_dH_eF_f$, where $a=1-6$, $b=1-12$, $c=1-12$, $d=1-2$, $e=0-5$ and $f=0-5$.

Preferably, at least 20 mol %, especially 40-60 mol %, of the blowing agent consists of at least one of said fluoroalkanes and at least one of said ethers. The blowing agent can also consist to the extent of 100 mol % of these two types of compounds. If, however—as will generally be the case—the blowing agent does not consist entirely of said compounds, the remainder consists of one of the afore-mentioned conventional blowing gases, although in general, for the reasons given above, CFC's will be substantially or completely avoided. Preferably, at least part of the remainder then consists of $CO_2$, which is produced by the addition of a suitable amount of water in the conversion of polyisocyanates to foams. A "suitable" amount of water is an amount which produces the desired proportion of $CO_2$. It is especially preferred to use a blowing gas which consists essentially of at least one fluoroalkane, at least one fluorinated ether and $CO_2$ (produced by the addition of water), that is to say that the above-mentioned "remainder" of the blowing gas consists essentially of $CO_2$.

As fluoroalkanes of formula (I), it is preferred to use those in which $a=2-5$, $b=1-9$ and $c=3-11$, especially those in which $a=2-4$, $b=1-6$ and $c=4-9$.

As fluorinated ethers of formula (II), preference is given to those in which $a=1-5$, $b=1-6$, $c=5-10$, $d=1-2$, $e=0-3$ and $f=2-5$ and those in which $a=1-3$, $b=1-4$, $c=1-6$, $d=1-2$, $e=0-3$ and $f=2-5$.

The fluoroalkanes and the fluorinated ethers can be linear or branched.

The molar ratio of the fluoroalkanes to the fluorinated ethers is preferably 1:10 to 10:1, especially 1:5 to 5:1.

The preparation of the fluoroalkanes (I) and the fluorinated ethers (II) is described in Ullmann's Encyclopedia of Industrial Chemistry, volume A 11 (1988), pages 349-389, especially pages 354-355 and 367; A. M. Lovelace et al., Aliphatic Fluorine Compounds (1958); and H. Liebig and K. Ulm, Herstellung und Anwendung aliphatischer Fluorverbindungen II (Preparation and Application of Aliphatic Fluorine Compounds II), Chemiker-Zeitung (1976), p. 3-13. The invention further relates to foams based on polyisocyanates which are obtainable by the above process.

When using said fluoroalkanes and fluorinated ethers, it is possible to use the hitherto conventional raw materials for foams and, as stated above, substantially to reduce the proportions of water or conventional physical blowing agent or even dispense with them completely.

Suitable polyisocyanates for the process according to the invention are the aliphatic, cycloaliphatic and aromatic di- or poly-isocyanates conventionally used for this purpose.

Preference is given to 2,4- and 2,6-toluyl diisocyanate, diphenylmethane diisocyanate, polymethylenepolyphenyl isocyanate and mixtures thereof. It is also possible to use polyisocyanates containing carbodiimide groups, urethane groups, allophanate groups, isocyanurate groups, urea groups or biuret groups, which are called "modified polyisocyanates" and "isocyanate prepolymers".

The polyisocyanates are reacted with compounds containing at least two hydrogen atoms reactive towards isocyanate groups, for example polyether-based, polyester-based and amine-based compounds containing hydroxyl groups and compounds containing amino and/or carboxyl and/or thiol groups. As a rule, these compounds have 2-8 hydrogen atoms reactive towards isocyanates.

In conventional manner, catalysts used in this reaction are tertiary amines, which may also contain hydrogen atoms active towards isocyanate groups, and/or organic metal compounds, preferably tin salts of carboxylic acids.

In general, surface-active additives, such as emulsifiers and foam stabilizers, are also used. The emulsifiers are e.g. salts of fatty acids. Polyether-siloxanes are often used as foam stabilizers.

Surprisingly, when using low-boiling fluoroalkanes which are gaseous under normal conditions (e.g. 1,1,1,2-tetrafluoroethane with a boiling point of 26.5° C. or 2H-heptafluoropropane with a boiling point of $-17.3°$ C.), in a mixture with fluorinated ethers, there is a considerable reduction in the vapor pressure of the blowing agent after mixing with the polyol reactant, making it possible to manufacture foams by an advantageous procedure. This pressure reduction is shown by way of example in Table 1.

EP-A2-0 345 580 proposes that, when using fluoroalkanes liquefied under pressure, such as tetrafluoroethane or heptafluoropropane, these should first be converted to the gaseous state and incorporated into the reactants as gas. This expensive procedure is not necessary when using the mixtures according to the invention.

Table 1 shows the surprising pressure reduction by way of four Examples: The vapor pressures in bar of 1,1,1,2-tetrafluoroethane and 2H-heptafluoropropane are given in the first two lines and the vapor pressures of mixtures of one of these two fluoroalkanes, a fluorinated ether and the polyol reactant according to one of the Examples according to the invention are given underneath.

The vapor pressure of the blowing agent mixtures according to the invention after mixing with the polyol reactant is in the region of atmospheric pressure, even when using gaseous fluoroalkanes, which is how such mixtures can be processed by the methods conventionally used for CFC 11 (boiling point 23.8° C.).

Small-celled foams of comparatively low thermal conductivity are obtained even with mixtures of fluorinated ethers and fluoroalkanes which are liquid at normal temperature, i.e. which have a boiling point above 20°-25° C.

It is also possible to use a mixture of fluoroalkanes having different boiling points, e.g. 1,1,1,2-tetrafluoroethane, which has a boiling point of $-26.5°$ C., and 1H-perfluorohexane, which has a boiling point of 70° C.

Examples 1-10 below illustrate the invention. They show suitable rigid foam formulations containing different proportions of various fluoroalkanes and fluorinated ethers. In the Comparative Examples, on the other hand, either $CO_2$ formed by the addition of water, or 1,1,1,2-tetrafluoroethane or 2H-heptafluoropropane, is used as the only blowing agent. A marked reduction in the thermal conductivity of the foams is already evident for relatively small proportions of fluoroalkane-/fluoroether of e.g. 15 mol %, based on the total amount of blowing agent. This effect even increases with storage time.

The blowing agents according to the invention are also suitable for the expansion of flexible foams with an open-cell structure and for the manufacture of foam moldings with a cellular core and a compact surface according to DE-AS 1 694 138 (corresponding to British patent 1 209 243).

The properties of the foams prepared in the following Examples are given in Table 2 thereafter.

COMPARATIVE EXAMPLE 1

Use of $CO_2$ as the only blowing agent 85 g of sucrose/propylene oxide polyether with an OH number of 380, 15 g of ethylenediamine/propylene oxide polyether with an OH number of 480, 1 g of foam stabilizer (type DC 193 from Dow Corning Corp.), 1.5 g of dimethylcyclohexylamine and 3.8 g of water were intimately mixed for 15 seconds by means of a stirrer at 2500 rpm, then intimately mixed for 10 seconds with 192 g of crude diphenylmethane diisocyanate (commercial grade MDI) and then poured into a paper mold. Foaming of the mixture began after approx. 15 seconds and had ended after approx. 75 seconds. This resulted in a rigid foam with the properties given in the Table.

COMPARATIVE EXAMPLE 2

Use of 1,1,1,2-tetrafluoroethane (boiling point 26.5° C.) in addition to $CO_2$ as blowing agent As in Comparative Example 1, 85 g of sucrose/propylene oxide polyether with an OH number of 280, 15 g of ethylenediamine/propylene oxide polyether with an OH number of 480, 1 g of foam stabilizer (type DC 193 from Dow Corning Corp.), 1.5 g of dimethylcyclohexylamine and 3.0 g of water were intimately mixed, filled into a pressure container (aerosol can) and sealed with a commercially available aerosol valve, and 5.8 g of 1,1,1,2-tetrafluoroethane gas were introduced. The mixture was homogenized by vigorous shaking, the excess pressure was then released from the can, the can was opened and the contents were intimately mixed with 180 g of MDI and poured into a paper mold. Foaming of the mixture resulted in a foam with a predominantly large-cell structure.

COMPARATIVE EXAMPLE 3

Use of 2H-heptafluoropropane (boiling point −17.3° C.) in addition to $CO_2$ as blowing agent The procedure was as in Comparative Example 2, except that 9.3 g of 2H-heptafluoropropane were used in place of the 5.8 g of 1,1,1,2-tetrafluoroethane.

EXAMPLE 1

The procedure was as in Comparative Example 2, except that 2.8 g of 1,1,1,2-tetrafluoroethane and 5 g of 2-hydrogenohexafluoropropyl methyl ether ($CF_3CHFCF_2OCH_3$) were used in place of the 5.8 g of 1,1,1,2-tetrafluoroethane.

EXAMPLE 2

The procedure was as in Comparative Example 2, except that the proportion of water was reduced from 3.0 to 2.0 g and the proportion of MDI was reduced from 180 g to 165 g, and 7.5 g of 1-hydrogenotetrafluoroethyl- methyl ether ($CHF_2-CF_2-O-CH_3$) were also used (in addition to the 1,1,1,2-tetrafluoroethane).

EXAMPLE 3

The procedure was as in Example 2, except that 9.7 g of 2H-heptafluoropropane were used in place of the 5.8 g of 1,1,1,2-tetrafluoroethane.

EXAMPLE 4

The procedure was as in Comparative Example 1, except that 2.0 g of water were used in place of the 3.8 g of water, 165 g of MDI were used in place of the 192 g of MDI and 11.5 g of 1,1,2,2,3,3,4,4-octafluorobutane and 7.5 g of 1-hydrogenotetrafluoroethyl methyl ether ($CHF_2CF_2-O-CH_3$) were used.

EXAMPLE 5

The procedure was as in Comparative Example 3, except that the proportion of 2H-heptafluoropropane was reduced to 4.7 g, and 5.0 g of 2-hydrogenohexafluoropropyl methyl ether ($CF_3-CHF-CF_2-O-CH_3$) were additionally used.

EXAMPLE 6

The procedure was as in Comparative Example 1, except that 5.0 g of 2-hydrogenohexafluoropropyl methyl ether and 2.2 g of 1,3-difluoropropane were also used. The proportion of water was reduced from 3.8 g to 3.0 g and the proportion of MDI was reduced from 192 g to 180 g.

EXAMPLE 7

The procedure was as in Comparative Example 2, except that 3.8 g of 1,1,1,2,2,3,3,4,4-nonafluorohexane ($CF_3CF_2-CF_2-CF_2-CH_2-CH_3$) and 2.3 g of 1,1-difluoro-2,2-difluoroethyl ethyl ether ($CHF_2-CF_2-O-CH_2-CH_3$) were used in place of the 5.8 g of 1,1,1,2-tetrafluoroethane.

EXAMPLE 8

45 g of sorbitol/glycerol/propylene oxide polyether with an OH number of 560, 15 g of ethylenediamine/-propylene oxide polyether with an OH number of 480, 20 g of glycerol/propylene oxide polyether with an OH number of 160, 20 g of tetrabromophthalate diol with an OH number of 220, 20 g of trichloroethyl phosphate, 1.0 g each of the foam stabilizers marketed by Dow Corning Corp. under the tradenames DC 190 and DC 198, 1.0 g of dimethylcyclohexylamine, 2.2 g of water, 14 g of 1,1,2,2,3,3,4,4,5,5,6,6,6-fluorohexane (1H-perfluorohexane, $CHF_2-CF_2CF_2-CF_2-CF_2-CF_3$) and 8.8 g of 1,1-difluoro-2-difluoroethyl 1,1,1-trifluoroethyl ether ($CHF_2-CF_2-O-CH_2-CF_3$) were mixed with 137 g of MDI by the procedure described in Comparative Example 1 and the mixture was foamed.

EXAMPLE 9

The formulation described in Example 8 was used, except that 7.4 g of 2H-heptafluoropropane were used in place of the 14 g of 1,1,2,2,3,3,4,4,5,5,6,6-fluorohexane and this compound was added to the mixture by the procedure described in Comparative Example 2.

EXAMPLE 10

The procedure was as in Example 9, except that the 7.4 g of 2H-heptafluoropropane were replaced with 4.5 g of 1,1,1,2-tetrafluoroethane.

TABLE 1

| Vapor pressures of fluoroalkanes and mixtures thereof with fluorinated ethers and raw materials for foams before the addition of polyisocyanate | |
| --- | --- |
| Type of component | Vapor pressure (bar) at 298 K. |
| 1,1,1,2-Tetrafluoroethane | 5.8 |
| 2H-Heptafluoropropane | 4.4 |
| Formulation of Example 10 (containing 1,1,1,2-tetrafluoroethane and 1,1-difluoro-2,2-difluoroethyl 1,1,1-trifluoroethyl ether) before MDI addition | 0.3 |
| Formulation of Example 1 (containing 1,1,1,2-tetrafluoroethane and 2-hydrogenohexafluoropropyl methyl ether) before MDI addition | 0.2 |
| Formulation of Example 9 (containing 2H-heptafluoropropane and 1,1-difluoro-2,2-difluoroethyl 1,1,1-trifluoroethyl ether) before MDI addition | 0.2 |
| Formulation of Example 5 (containing 2H-heptafluoropropane and 2-hydrogenohexafluoropropyl methyl ether) before MDI addition | 0.1 |

TABLE 2

| | | | | Properties of the foam | |
| --- | --- | --- | --- | --- | --- |
| | | Mol ratio water/blowing | Bulk density | Thermal conductivity 23° C., mW/(m · K) | |
| | Blowing gas components used apart from $CO_2$ | gas | (kg/m³) | after 1 day | after 6 weeks |
| Comparative Example | 1 none | 100/0 | 37 | 25.8 | 34.7 |
| Comparative Example | 2 1,1,1,2-tetrafluoroethane (R 134a) | 75/25 | 43 | 26.4 | 30.2 |
| Comparative Example | 3 2H-heptafluoropropane (R 227) | 75/25 | 48 | 24.9 | 31.1 |

TABLE 2-continued

| | Blowing gas components used apart from $CO_2$ | Mol ratio water/blowing gas | Properties of the foam | | |
|---|---|---|---|---|---|
| | | | Bulk density ($kg/m^3$) | Thermal conductivity 23° C., mW/(m · K) | |
| | | | | after 1 day | after 6 weeks |
| Example 1 | R 134a and $CH_3OCF_2CHFCF_3$ | 75/25 | 36 | 24.2 | 26.8 |
| Example 2 | R 134a and $CH_3OCF_2CHF_2$ | 50/50 | 42 | 23.3 | 25.7 |
| Example 3 | R 227 and $CH_3OCF_2CHF_2$ | 50/50 | 41 | 23.0 | 25.4 |
| Example 4 | $HCF_2CF_2CF_2H$ and $CH_3OCF_2CHF_2$ | 50/50 | 36 | 22.5 | 23.6 |
| Example 5 | R 227 and $CH_3OCF_2CHFCF_3$ | 75/25 | 37 | 23.8 | 25.6 |
| Example 6 | $FCH_2CH_2CH_2F$ and $CH_3OCF_2CHFCF_3$ | 75/25 | 35 | 24.2 | 27.5 |
| Example 7 | $CH_3CH_2CF_2CF_2CF_2CF_3$ and $C_2H_5OCHFCF_3$ | 85/15 | 39 | 23.5 | 26.8 |
| Example 8 | $HCF_2CF_2CF_2CF_2CF_2CF_3$ and $CF_3CH_2OCHFCF_3$ | 60/40 | 34 | 22.2 | 23.1 |
| Example 9 | R 227 and $CF_3CH_2OCHFCF_3$ | 60/40 | 38 | 22.9 | 23.8 |
| Example 10 | R 134a and $CF_3CH_2OCHFCF_3$ | 60/40 | 36 | 23.2 | 24.2 |

What is claimed is:

1. A process for the manufacture of foams based on polyisocyanates by the reaction of the components comprising polyisocyanates, compounds containing at least two hydrogen atoms reactive towards isocyanate groups, and blowing agents and, wherein the blowing agents used comprise to the extent of at least 10 mol % of at least one fluoroalkane of formula (I), $C_aH_bF_c$, where a=2-6, b=1-12 and c=2-12, d=1-2, e=0-5 and f=0-5.

2. A process as claimed in claim 1, wherein part of the remainder of the blowing agent is a physical blowing agent other than a fluoroalkane of formula (I) of a fluorinated ether of formula (II).

3. A process as claimed in claim 1, wherein at least part of the remainder of the blowing agent includes $CO_2$ which is formed by the addition of water during the reaction of the polyisocyanates.

4. A process as claimed in claim 3, wherein part of the remainder of the blowing agent includes a physical blowing agent other than a fluoroalkane of formula (I) or a fluorinated ether of formula (II).

5. A process as claimed in claim 1, wherein the remainder of the blowing agent consists essentially of $CO_2$ which is formed by the addition of water during the reaction of the polyisocyanates.

6. A process as claimed in claim 1, wherein the blowing agent used comprises to the extent of at least 20 mol % of at least one fluoroalkane of formula (I) and at least one fluorinated ether of formula (II).

7. A process as claimed in claim 1, wherein the blowing agent used comprises to the extent of 40-60 mol % of at least one fluoroalkane of formula (I) and at least one fluorinated ether of formula (II).

8. A process as claimed in claim 1, wherein one or more fluoroalkanes of formula (I) in which a=2-5, b=1-9 and c=3-11 are used.

9. A process as claimed in claim 1, wherein one or more fluoroalkanes of formula (I) in which a=2-4, b=1-6 and c=4-9 are used.

10. A process as claimed in claim 1, wherein one or more fluorinated ethers of formula (II) in which

| a = 1-5 | d = 1-2 |
|---|---|
| b = 1-6 | e = 0-3 |
| c = 5-10 | f = 2-5 | are used.

11. A process as claimed in claim 1, wherein one or more fluorinated ethers of formula (II) in which

| a = 1-3 | d = 1-2 |
|---|---|
| b = 1-4 | e = 0-3 |
| c = 1-6 | f = 2-5 | are used.

12. A process as claimed in claim 1, wherein the molar ratio of the fluoroalkanes of formula (I) to the fluorinated ethers of formula (II) is 1:10 to 10:1.

13. A process as claimed in claim 1, wherein said components include a catalyst or a surface-active additive.

14. A foam obtained by the process as claimed in claim 1.

* * * * *

UNITED STATES PATENT AND TRADEMARK OFFICE
CERTIFICATE OF CORRECTION

PATENT NO. : 5,169,873
DATED : December 8, 1992
INVENTOR(S) : Behme, et al

It is certified that error appears in the above-indentified patent and that said Letters Patent is hereby corrected as shown below:

In claim 1, col. 7, line 26, please delete "c=2-12" and insert --c=1-13--.

In claim 1, col. 7, line 26, insert the phrase --and at least one fluorinated ether of formula (II), $C_aH_bF_c-O-C_dH_eF_f$, where a = 1-6, b = 1-12, c = 2-12,--.

Signed and Sealed this

Nineteenth Day of April, 1994

Attest:

BRUCE LEHMAN

*Attesting Officer*  Commissioner of Patents and Trademarks